Feb. 9, 1937. G. H. HUFFERD 2,070,051
CUSHIONED TRUNNION JOINT
Filed Nov. 9, 1935
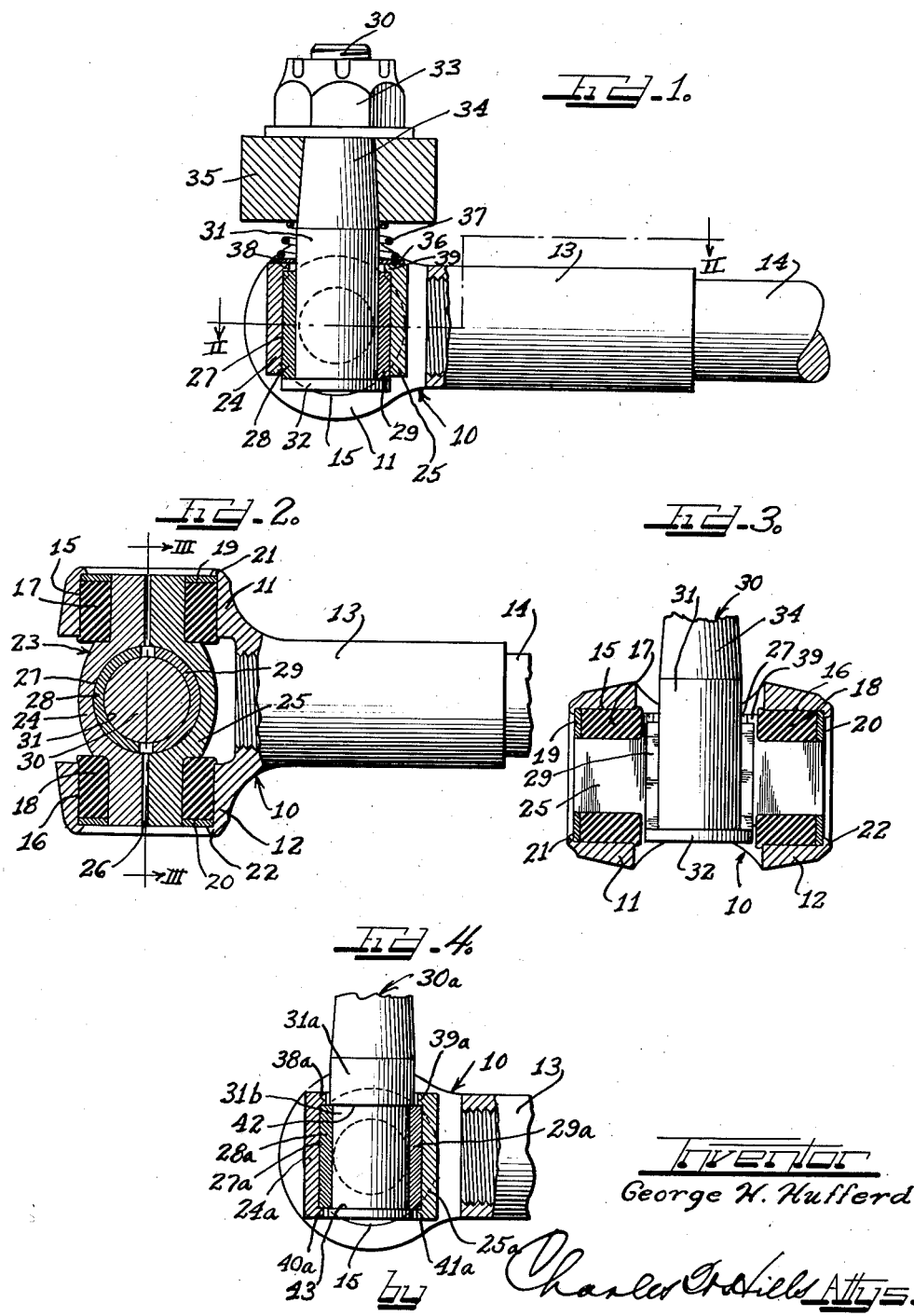
Inventor
George H. Hufferd.
by Charles H. Wills Attys.

Patented Feb. 9, 1937

2,070,051

UNITED STATES PATENT OFFICE 2,070,051

CUSHIONED TRUNNION JOINT

George H. Hufferd, Detroit, Mich., assignor to Thompson Products, Incorporated, Cleveland, Ohio, a corporation of Ohio Application November 9, 1935, Serial No. 49,000

6 Claims. (Cl. 287—1)

This invention relates to a trunnion type joint adapted to automatically compensate for wear of the bearing elements therein.

More specifically this invention relates to a resiliently cushioned trunnion type tie rod joint in which the bearing elements therein are maintained in full bearing engagement at all times.

It is an object of this invention to provide a trunnion type joint with automatic wear compensating features.

Another object of this invention is to provide a resiliently cushioned trunnion joint in which the bearing elements do not become loose during use of the joint.

A further object of this invention is to provide a universal trunnion joint in which the bearing elements are always maintained in full bearing engagement with each other.

A specific object of this invention is to provide a rubber cushioned trunnion joint adapted for use in tie rod connections for automotive steering mechanisms.

Other and further objects of this invention will become apparent from the following detailed description of the annexed sheet of drawing which discloses preferred embodiments of the invention.

On the drawing:

Figure 1 is a side elevational view, with parts in vertical cross section, of a joint according to this invention, Figure 2 is a horizontal cross-sectional view, with parts in elevation, taken substantially along the line II—II of Figure 1, Figure 3 is a vertical cross-sectional view, with parts in elevation, taken substantially along the line III—III of Figure 2, Figure 4 is a side elevational view, with parts in vertical cross section, of a modified form of joint according to this invention.

As shown on the drawing:

In Figures 1 to 4 inclusive, the reference numeral 10 indicates generally a bifurcated or forked member constituting the housing for joints of this invention. The forked member 10 comprises a pair of spaced furcations or legs 11 and 12 and an internally threaded laterally extending shank 13 adapted to be threaded around a rod such as a tie rod 14.

The furcations 11 and 12 have axially aligned cylindrical openings 15 and 16 extending therethrough for receiving respectively annular collars 17 and 18 composed of a resilient material such as, for example, rubber. The rubber collars 17 and 18 are held in the apertures or openings 15 and 16 by metal washers 19 and 20 respectively which are spun into the openings 15 and 16 as indicated at 21 and 22 by merely turning down the metal of the furcations 11 and 12 around the periphery of the apertures therein.

A trunnion member, indicated generally by the reference numeral 23 in Figure 2 is composed of two axially aligned segments 24 and 25 spaced from each other as indicated at 26 and seated at their ends thereof in the rubber collars 17 and 18 respectively. As shown in Figure 1, the ends of the segments 24 and 25 define cylinders thereby permitting some rotation of the trunnion member relative to the housing 10.

The central portions of the segments 24 and 25 together define a cylindrical socket 27 extending therethrough. A pair of bearing sleeves 28 and 29 are held in the socket 27 in spaced relation from each other. A stud 30 extends through the socket 27 and has a cylindrical bearing portion 31 in bearing engagement with the sleeves 28 and 29.

A collar or circular flange 32 is formed on the stud 30 below the cylindrical bearing portion 31 as shown in Figures 1 and 3. The semi-cylindrical bearing sleeves 28 and 29 abut the collar 32 of the stud and are seated thereon.

As shown in Figure 1, the top portion of the stud 30 is threaded and receives a nut 33 therearound. The intermediate portion of the stud 34 is tapered and receives the end 35 of a steering arm or other connection. A washer 36 fits over the top of the trunnion members 24 and 25 as shown in Figure 1 and is disposed around the cylindrical portion 31 of the stud. A coiled spring 37 is held under compression between the end 35 and the washer 36 so as to urge the stud member upwardly in the socket 27. This causes the collar 32 of the stud to carry the bearing sleeves 28 and 29 against inturned flanges 38 and 39 formed on the trunnion members 24 and 25 at the upper end of the socket 27, thereby abutting the tops of the cylindrical bearing sleeves 28 and 29 and holding these sleeves in the socket 27.

Since the trunnion members 24 and 25 are held in the rubber collars 17 and 18 which are maintained under compression, these members are urged toward each other to lessen the space 26 therebetween. At the same time, however, the bearing sleeves 28 and 29 are tightened around the cylindrical bearing portion 31 of the stud to be fully seated around the stud. The resiliency of the collars 17 and 18 and their tendency to expand thereby maintains the stud in full bearing engagement with the seating member at all times and any wearing away of the bearing surfaces is automatically compensated for by the expansion of the compressed resilient collars. The stud can thus rotate freely about its own axis in the bearing sleeves 28 and 29 and can tilt to a limited degree in all directions relative to the housing 10 because of the flowability and resiliency of the rubber collars 17 and 18. The coiled spring 37, in urging the stud upwardly in the socket 27 holds the bearing sleeves 28 and 29 in the socket. Obviously the joint can also be used in inverted position whereby the weight of the stud and its attached arm 35 will be sufficient to hold the bearing sleeves in the socket by gravity. In this inverted position, the coiled spring can be dispensed with.

In Figure 4 there is shown a modified construction in which the bearing sleeves are maintained within the socket defined by the trunnion segments without the aid of additional outside elements.

As shown in Figure 4 the trunnion segments 24a and 25a are provided with inturned flanges 38a and 39a at the top thereof similar to the flanges 38 and 39 shown in Figure 1. However the bottoms of the trunnion members 24a and 25a are also provided with inturned flanges 40a and 41a respectively.

The bearing sleeves 28a and 29a are seated in the socket 27a defined by the trunnion segments but are abutted, on both edges thereof, by the inturned flanges 38a, 39a, 40a and 41a respectively.

Thus when the rubber collars fitted around the ends of the trunnion segments 24a and 25a urge said segments together around the bearing sleeves 28a and 29a these sleeves are held against axial displacement by the inturned flanges formed on the trunnion segments and no additional holding element is necessary.

The operation of the modified form of joint shown in Figure 4 is identical with the operation of the joint shown in Figures 1, 2 and 3, namely, the stud 30a rotates about its own axis in the socket 27a on the bearing sleeves 28a and 29a and can tilt to a limited extent, in all directions relative to the housing 10 because of the resilient flowability of the rubber collars in which the trunnion members are seated. However the cylindrical portion 31a of the stud 30a is machined down as at 31b, between the bearing sleeves 28a and 29a to form shoulders 42 and 43 which abut the top and bottom edges respectively of the bearing sleeves. In this manner the stud is held against axial displacement in the socket 27a.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A joint comprising a forked housing having two spaced furcations with aligned openings therethrough, resilient collars in said openings, a trunnion composed of two axially spaced segments seated at the ends thereof in said resilient collars, said segments together defining a cylindrical socket through the central portion of the trunnion, a stud extending through said socket and rotatable therein, said resilient collars being maintained under compression to urge the segments of the trunnion toward each other for decreasing the size of the socket to compensate for wear of the bearing surfaces therein.

2. A tie rod joint comprising a bifurcated member having two spaced apertured furcations and a laterally extending shank adapted to be connected to the end of a tie rod, a trunnion composed of two axially spaced segments having the ends thereof disposed in said apertures of the furcations, rubber collars disposed around the ends of said segments and held under compression in said apertures, a cylindrical socket formed through the central portion of said trunnion, a pair of spaced semi-cylindrical bearing sleeves seated in said socket, a stud having a cylindrical bearing portion in bearing engagement with said sleeves, and means for maintaining said stud in said socket whereby the stud is freely rotatable about its own axis in the socket and universally tiltable relative to the housing through flowability of the rubber collars, said collars, at all times, tending to decrease the size of the socket for maintaining the bearing sleeves therein in full bearing engagement with the stud.

3. A tie rod joint comprising a forked member having a laterally extending threaded shank adapted to be connected to the end of a tie rod and a pair of spaced apertured furcations, a trunnion member composed of two axially spaced segments defining a cylindrical socket in the central portion thereof and laterally extending cylindrical ends disposed in said apertures of the furcations, rubber collars seated around the ends of said segments and held under compression in the apertures of the furcations, washers spun into said apertures for holding the rubber collars therein, a pair of spaced semi-cylindrical bearing sleeves in said socket, a stud extending through said socket and having a cylindrical bearing portion in bearing engagement with said sleeves, an annular collar on the end of said stud for abutting the edges of said sleeves, said segments of the trunnion member having inturned flanges formed around the periphery of the socket defined thereby and spring means disposed around said stud for forcing the collar of the stud to carry the bearing sleeves into abutting relation to the inturned flanges of the trunnion segments.

4. A tie rod joint comprising a bifurcated member having a laterally extending threaded shank for connection to the end of a tie rod and a pair of spaced furcations having aligned apertures therethrough, a trunnion member resiliently seated in said apertures, said trunnion member defining a cylindrical socket in the central portion thereof between said furcations, a pair of bearing sleeves in said socket, inturned flanges formed at the top and bottom of said socket for preventing axial displacement of the bearing sleeves, a stud having a cylindrical bearing portion of reduced diameter in bearing engagement with said bearing sleeve and having shoulders formed at the ends of said cylindrical bearing portion in abutting relation to the edges of said sleeves whereby said stud can rotate freely about its own axis while being held against lateral displacement in the socket and can tilt freely in all directions due to the flowability of the resilient mountings for the trunnion member.

5. A joint comprising a bifurcated member having two spaced furcations with aligned apertures therethrough, a pair of segments defining together a trunnion member having cylindrical ends and a central opening extending therethrough, rubber collars fitted over the cylindrical ends of said trunnion member and held under compression in the apertures of said furcations, a stud having a cylindrical bearing portion extending through the opening of said trunnion, a pair of spaced segmental cylindrical bearing sleeves disposed between said cylindrical bearing portion of the stud and said trunnion member, and means for holding said bearing sleeves against axial displacement, said rubber collars urging said bearing sleeves toward each other to snugly fit around said stud.

6. A joint comprising a bifurcated member having a pair of spaced furcations with aligned openings therethrough, resilient collars disposed in said openings, a split trunnion seated at its ends in said collars and defining a socket in the central portion thereof between the furcations and a stud seated in the socket whereby the collars urge the segments of the split trunnion together to maintain a proper seating of the stud in the socket.

GEORGE H. HUFFERD.